United States Patent [19]

Morimoto

[11] Patent Number: 5,396,419
[45] Date of Patent: Mar. 7, 1995

[54] PRE-EDIT SUPPORT METHOD AND APPARATUS

[75] Inventor: Yasutsugu Morimoto, Kawasaki, Japan

[73] Assignee: Hitachi, Ltd., Tokyo, Japan

[21] Appl. No.: 942,030

[22] Filed: Sep. 8, 1992

[30] Foreign Application Priority Data

Sep. 7, 1991 [JP] Japan .................. 3-255839

[51] Int. Cl.⁶ .......................... G06F 15/38
[52] U.S. Cl. ............... 364/419.02; 364/419.04
[58] Field of Search ........ 364/419, 419.02, 419.08, 364/419.04

[56] References Cited

U.S. PATENT DOCUMENTS

| | | | |
|---|---|---|---|
| 4,641,264 | 2/1987 | Nitta et al. | 364/419 |
| 4,774,666 | 9/1988 | Miyao et al. | 364/419 |
| 4,791,587 | 12/1988 | Doi | 364/419 |
| 4,954,984 | 9/1990 | Kaijima et al. | 364/419 |
| 4,962,452 | 10/1990 | Nogami et al. | 364/419 |
| 5,023,786 | 6/1991 | Kugimiya et al. | 364/419 |

FOREIGN PATENT DOCUMENTS

| | | |
|---|---|---|
| 58-40684 | 3/1983 | Japan . |
| 59-121574 | 7/1984 | Japan . |
| 59-140582 | 8/1984 | Japan . |
| 1-35661 | 2/1989 | Japan . |
| 1-102679 | 4/1989 | Japan . |

Primary Examiner—Gail O. Hayes
Assistant Examiner—Xuong Chung-Trans
Attorney, Agent, or Firm—Antonelli, Terry, Stout & Kraus

[57] ABSTRACT

A pre-edit support method for a machine translation system has an improved accuracy of parsing and an improved efficiency of pre-edit support. In a machine translation system translating a source language into a target language, a source language text is read and divided into words. Word sequences occurring a plurality of times are extracted, of the extracted word sequences the word sequences having a high occurrence frequency or a large number/high ratio of words with multiple parts of speech, are extracted as complex word candidates and displayed to a user, of the complex word candidates the complex word candidates the user designates are used as complex words to be translated integrally, and pre-edit symbols are added to the integral complex words as translation support information.

11 Claims, 21 Drawing Sheets

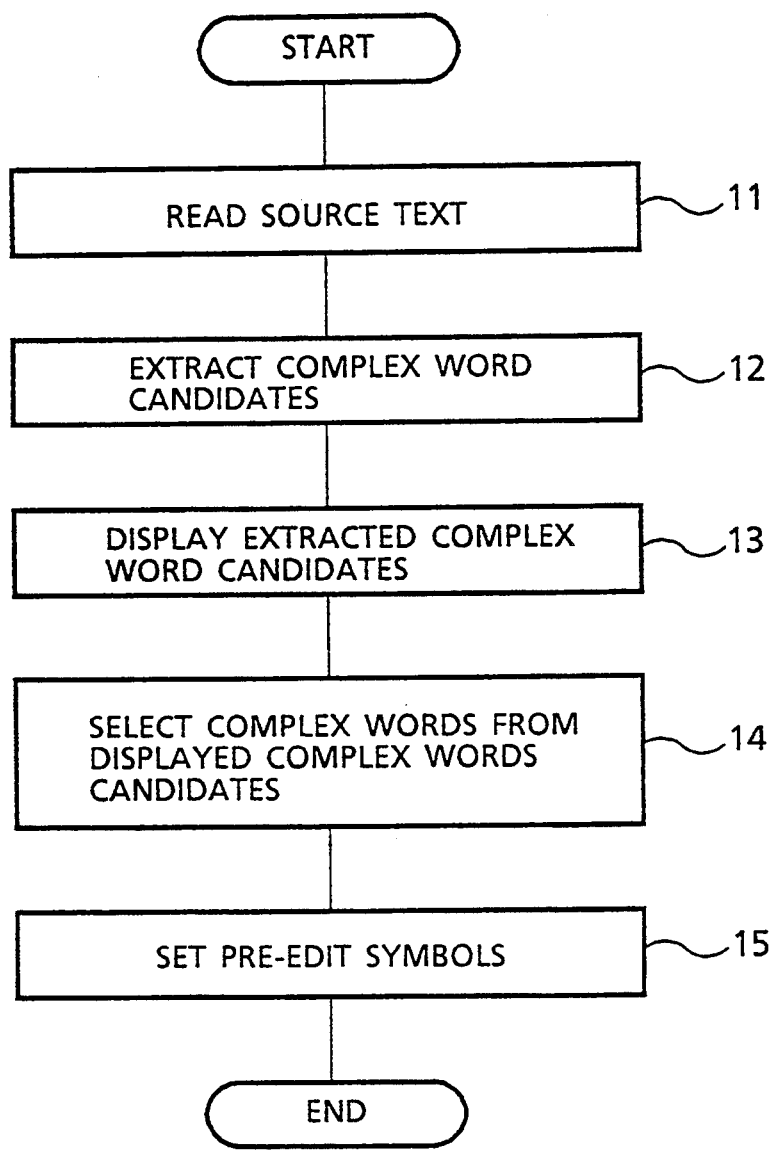

FIG. 3

1: Fuzzy reasoning in expert system building tools XXXX series

2: The fuzzy reasonsing function that can deal with the ambiguous knowledge of human beings has been developed as a new function of XXXX/1 and XXXX/2.

3: The expert system incorporates the experience of human beings and the know-how in a computer.

4: Expert systems are used in the business field as effective means to realize SIS and CIM.

5: Expert system building tool XXXX that supports the building had many functions, and an order for more than 2,000 systems was received.

6: And, XXXX is evaluated most highly in Japan and is used in the field of finance, manufacture, distribution and so on.

7: The expert system acts for a human to support decision making.

8: The conventional expert system used rule-based reasoning.

9: The rule-based reasoning is based on certain knowledge.

10: Therefore it is necessary to strictly describe know-how when editing a rule base.

11: Therefore it is difficult to represent intuitive knowledge.

12: On the other hand the fuzzy reasoning is a technique that is suitable for simulation of the subjective knowledge .....

| SENTENCE \ WORD | 1 | | 2 | | 3 | | 4 | | ... |
|---|---|---|---|---|---|---|---|---|---|
| 1 | 1 | 5 | 7 | 15 | 17 | 18 | | | ... |
| | fuzzy | | reasoning | | in | | | | ... |
| 2 | 1 | 3 | 5 | 9 | 11 | 19 | | | ... |
| | the | | fuzzy | | reasoning | | | | ... |
| 3 | 1 | 3 | 5 | 10 | 12 | 17 | | | ... |
| | the | | expert | | system | | | | ... |
| | | | | | | | | | ... |

81

| SENTENCE\WORD | 1 | | | | 2 | | | | 3 | | | | 4 | | | | ... |
|---|---|---|---|---|---|---|---|---|---|---|---|---|---|---|---|---|---|
| 1 | 1 | 0 | 0 | ... | 0 | 0 | 0 | ... | 0 | 0 | 0 | ... | 1 | 1 | 1 | ... | ... |
| 2 | 0 | 0 | 0 | ... | 1 | 1 | 0 | ... | 0 | 0 | 0 | ... | 0 | 0 | 0 | ... | ... |
| 3 | 0 | 0 | 0 | ... | 1 | 0 | 0 | ... | 0 | 0 | 0 | ... | 0 | 0 | 0 | ... | ... |
| 4 | 1 | 0 | 0 | ... | 0 | 0 | 0 | ... | 0 | 0 | 0 | ... | 0 | 0 | 0 | ... | ... |
| ⋮ | | | | | | | | | | | | | | | | | ... |

| NUMBER | ENTRY | | | NUMBER OF ENTRY WORDS | OCCURRENCE FREQUENCY | OCCURRENCE POSITION | | | | | |
|---|---|---|---|---|---|---|---|---|---|---|---|
| 1 | fuzzy | reasoning | function | 3 | 3 | 2 | 2 | | | | ... |
| 2 | fuzzy | reasoning | | 2 | 17 | 1 | 1 | 2 | 2 | 12 | ... |
| 3 | fuzzy | reasoning | mechanism | 3 | 2 | 17 | 3 | 18 | 8 | 6 | ... |
| ... | ... | | | | | | | ... | | | |

| OCCURRENCE FREQUENCY | COMPLEX WORD |
|---|---|
| 17 | fuzzy reasoning |
| 10 | expert system |
| 8 | rule-based reasoning |
| 4 | membership function |
| 4 | reasoning function |
| 4 | XXXX/1 and XXXX/2 |
| 3 | fuzzy reasoning function |
| 3 | intuitive knowledge |
| 3 | reasoning mechanism |
| 3 | uncertain knowledge |
| 2 | certain knowledge |
| 2 | expert system building tool |
| 2 | expert system building |
| 2 | building tool |
| 2 | functional pattern |
| 2 | fuzzy frame |
| 2 | fuzzy knowledge |
| 2 | fuzzy reasoning mechanism |
| 2 | human beings |
| 2 | new function |
| 2 | practical use |
| 2 | system building tool |
| 2 | system building |

| NO. | NUMBER OF PARENT COMPLEX WORDS | PARENT COMPLEX WORDS | | | | POSITION WITHIN PARENT COMPLEX WORD | | | |
|---|---|---|---|---|---|---|---|---|---|
| 1 | 0 | | | | | | | | |
| 2 | 2 | 1 | 3 | | | 1 | 1 | | |
| 3 | 0 | | | | | | | | |
| . | . | . | | | | . | | | |

| NO. | NUMBER OF CHILD COMPLEX WORDS | CHILD COMPLEX WORD | | | | POSITION WITHIN CHILD COMPLEX WORD | | | |
|---|---|---|---|---|---|---|---|---|---|
| 1 | 1 | 2 | | | | 1 | | | |
| 2 | 0 | | | | | | | | |
| 3 | 1 | 2 | | | | 1 | | | |
| . | . | . | | | | . | | | |

| NO. | DISPLAY FLAG |
|---|---|
| 1 | 1 |
| 2 | 1 |
| 3 | 1 |
| . | . |
| . | . |
| . | . |

CANDIDATE LIST DISPLAY MODE

1 : expert system building tool
2 : fuzzy reasoning function
3 : fuzzy reasoning mechanism
4 : XXXX/1 and XXXX/2
5 : fuzzy reasoning
6 : expert system
7 : rule-based reasoning
8 : membership function
9 : reasoning function
10 : intuitive knowledge

SELECT COMPLEX WORD CANDIDATE CONTINUE TO TEXT PAGE

1: <u>Fuzzy reasoning</u> in <u>expert system building tools</u> XXXX series.

2: The <u>fuzzy reasoning function</u> that can deal with the ambiguous knowledge of human beings has been developed as a new function of <u>XXXX/1 and XXXX/2</u>.

3: The <u>expert system</u> incorporates the experience of <u>human beings</u> and the know-how in a computer.

4: <u>Expert systems</u> are used in the business field as effective means to realize SIS and CIM.

5: <u>Expert system building tool</u> XXXX that supports the building had many functions, and an order for more than 2,000 systems was received.

6: And, XXXX is evaluated most highly in Japan and is used in the field of finance, manufacture, distribution and so on.

FIG. 20

| NO. | SELECT STATE | FIX STATE |
|-----|--------------|-----------|
| 1   | 1            | 0         |
| 2   | 1            | 1         |
| .   | .            | .         |
| .   | .            | .         |

ADDITION OF COMPLEX WORD TRANSLATION

COMPLEX WORD : fuzzy reasoning
TRANSLATION [                    ]

fuzzy
  1. KEBADATTA
  2. BOYAKETA
  3. OTHER [fazi      ] →[ 3 ]

reasoning
  1. SUIRON
  2. RIRON
  3. OTHER [         ] → [ 1 ]

FIG. 23

1: [Fuzzy reasoning] in [expert system building tools] XXXX series.

2: The [fuzzy reasoning function] that can deal with the ambiguous knowledge of human beings has been developed as a new function of [XXXX/1 and XXXX/2].

3: The [expert system] incorporates the experience of human beings and the know-how in a computer.

4: [Expert systems] are used in the business field as effective means to realize SIS and CIM.

5: [Expert system building tool] XXXX that supports the building had many functions, and an order for more than 2,000 systems was received.

6: And, XXXX is evaluated most highly in Japan and is used in the field of finance, manufacture, distribution and so on.

7: The [expert system] acts for a human to support decision making.

8: The conventional [expert system] used rule-based reasoning.

9: The rule-based reasoning is based on certain knowledge.

10: Therefore it is necessary to strictly describe know-how when editing a rule base.

11: Therefore it is difficult to represent intuitive knowledge.

12: On the other hand the [fuzzy reasoning] is a technique that is suitable for simulation of the subjective knowledge .....

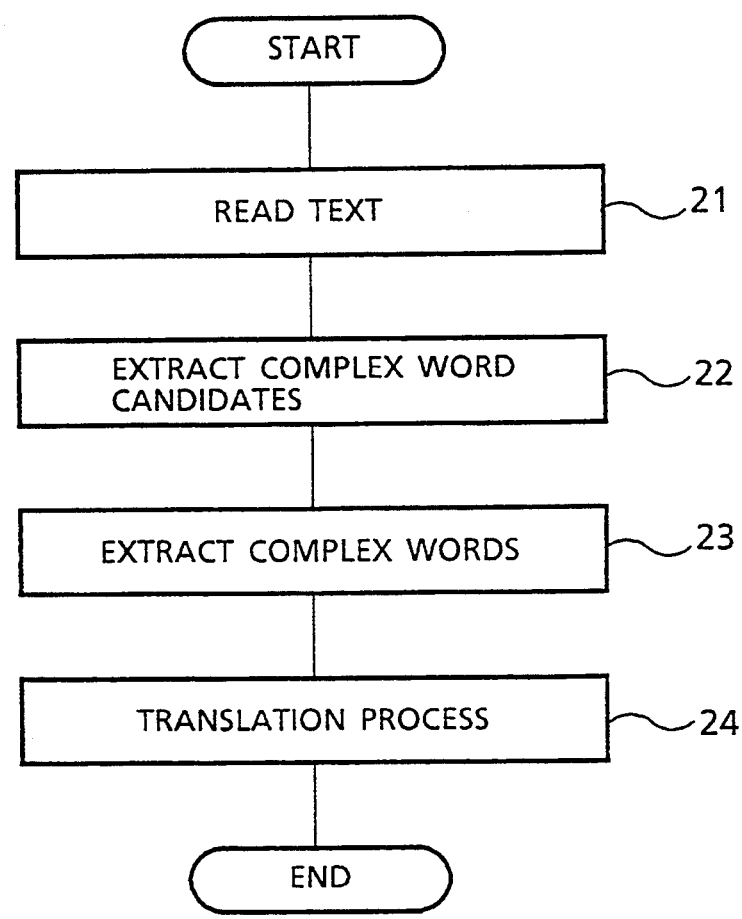
F I G . 24

| NO. | CHARACTER SEQUENCE | PAGE NODE | NUMBER OF CHILD NODES | CHILD NODE | | |
|---|---|---|---|---|---|---|
| 1 | The | | 0 | | | |
| 2 | fuzzy | 30 | 0 | | | |
| 3 | reasoning | 30 | 0 | | | |
| 4 | function | 30 | 0 | | | |
| 5 | that | | 0 | | | |
| 6 | can | | 0 | | | |
| 7 | deal | | 0 | | | |
| 8 | with | | 0 | | | |
| ⋮ | ⋮ | ⋮ | ⋮ | | | |
| 30 | | | 3 | 2 | 3 | 4 |
| ⋮ | ⋮ | ⋮ | ⋮ | | | |

88

PRE-EDIT SUPPORT METHOD AND APPARATUS

BACKGROUND OF THE INVENTION

1. Field of the Invention

The present invention relates to a machine translation system for translating a plurality of sentences, and more particularly to a pre-edit support method and apparatus for machine translation systems.

2. Description of the Related Art

It is not realistic to expect perfect automatic translation by machine translation systems of present state-of-the-art. As a means for improving the accuracy of translation, a manual support method has been proposed. For example, as described in JP-A-59-140582, it is known to supply translation support information prior to or at the intermediate stage of translation. Of such methods, a method of indicating part of a source text to be processed as an integral part such as a phrase or a clause, for example, by parenthesizing it, is used as a general pre-edit support method in machine translation systems.

Such a method, however, requires a number of operation steps because it is necessary for a user to read a source text and search for the text positions to which support information is to be supplied.

In order to solve such inconvenience, there is known another pre-edit support method as described in JP-A-1-35661, whereby candidate positions to which support information is to be supplied are presented to a user.

In sentences used in the scientific and technical field, which sentences are a main objective of machine translation systems, technical terms of a complex word composed by a plurality of words frequently appear. Such a complex word is generally to be treated as a single integrated word, because it is often difficult to obtain a correct translation of the complex word from a simple combination of translations of words constituting the complex word. In this connection, there is known a method of extracting complex words from a text having a plurality of sentences, as JP-A-1-102679.

SUMMARY OF THE INVENTION

It is an object of the present invention to improve the accuracy of parsing of machine translation systems and improve the efficiency of pre-edit support.

This object has been derived from the following problems associated with the above-described prior arts.

According to the prior art pre-edit support method for machine translation, a large number of positions in a text to which support information is to be supplied are detected, and a user is required to process each of such positions, which imposes complicated and troublesome works on a user.

Only a single point is given as a basis for a necessity of extracting complex words. Namely, it is difficult to obtain a correct translation of a complex word from a simple combination of translations of words constituting the complex word. Therefore, with the prior art technology, a complex word is extracted and added to a dictionary to improve the quality of its translations.

Extracting a complex word and adding it to a dictionary improves not only the quality of its translations, but also the accuracy of parsing by preventing a failure in disambiguation of multiple parts of speech. For example, consider the following sentence (example 1):

Time flies like an arrow.

In this case, two types of parsing are possible. Namely, one parsing is that "time" is a subject and "flies" is a verb, and the other parsing is that "time flies" is a subject and "like" is a verb. Of course, it is correct to consider "time" as the subject. Many people reason about this in that a complex word "time flies" will not be present probably. This becomes more evident from the following sentence (example 2):

Tsetse flies like blood.

This sentence example 2 also has an ambiguity like the sentence example 1. A person who knows that "tsetse flies" are one kind of flies considers "tsetse flies" as a subject and "like" as a verb. However, for a person who does not know "tsetse flies", it is difficult to parse the sentence. In machine translation, in order to parse the sentence example 2, it is necessary to recognize "tsetse fly" as an integral complex word.

As stated above, the effects of extracting a complex word and adding it to a dictionary are (1) improvement of the quality of translation of complex word, and (2) improvement of the accuracy of parsing. For the purpose of the effect (1), it is essential to add a complex word to a dictionary. However, for the purpose of the effect (2), it is not necessary to provide a translation of an extracted complex word, but only necessary to obtain information that the extracted complex word should be processed as one integrated complex word.

In practice, there are many cases where a correct translation of a complex word can be obtained from a simple combination of translations of words constituting the complex word. In such cases, it is not necessary to perform a complex work of adding a translation of a complex word to a dictionary. Moreover, there is a case that an extracted complex word is not proper to be added to a dictionary. An example of such an improper complex word candidate found in an actual text will be given below illustratively:

excitatory and inhibitory links The terms "excitatory link" and "inhibitory link" are usually added to a dictionary as a complex word. However, the example phrase "excitatory and inhibitory links" is not usually added to a dictionary. This phrase including coordination and ellipsis is difficult to be parsed. However, if this phrase can be recognized as an integral noun clause, it is effective for the improvement of the accuracy of parsing.

In order to achieve the above objects of the invention, there is provided a machine translation system for translating a source language into a target language, in which a source language text is read and divided into words and word sequences occurring a plurality of times are extracted. Ones of the extracted word sequences having a high occurrence frequency or a large number/high ratio of words with multiple parts of speech, are extracted as complex word candidates and displayed to a user. Ones of the extracted complex word candidates the user designates are recognized as complex words to be translated integrally, and pre-edit symbols are added to the integral complex words as translation support information.

According to the present invention, word sequences occurring frequently are extracted as complex word candidates and displayed to a user. Some of the complex word the user designates are processed as integral complex words, thereby improving the accuracy of parsing. Different from a conventional method of adding every complex word to a dictionary, the invention method is not required to enter translations of all complex words.

Word sequences occurring frequently are used as complex word candidates. When a user designates a word sequence as a complex word, all the same word sequences occurring at different positions of a text are processed as a complex word, thereby improving the efficiency of pre-edit support.

BRIEF DESCRIPTION OF THE DRAWINGS

The objects and features of the invention will best be understood from a detailed description of preferred embodiments thereof, selected for purposes of illustration and shown in the accompanying drawings, in which:

FIG. 2 is a flow chart showing the operation outline of the embodiment according to the present invention;

FIG. 3 shows an example of a source text to be processed;

FIG. 9 shows an example of a complex word table 83;

FIG. 10 shows an example of extracted complex words;

FIG. 13 shows an example of the parent table 84;

FIG. 14 shows an example of the child table 85;

FIG. 16 shows an example of a displaying complex word table 86;

FIG. 17 shows an example of a display of a complex word candidate list;

FIG. 18 shows an example of an in-text emphasis display;

FIG. 20 shows an example of a complex word state table 87;

FIG. 21 shows an example of a display screen relative to which translation for a complex word is entered by a user;

FIG. 23 shows an example of a pre-edited text;

FIG. 24 is a flow chart showing the procedure of the outline operation of the second embodiment;

DETAILED DESCRIPTION OF THE PREFERRED EMBODIMENTS

Preferred embodiments of the present invention will be described with reference to the accompanying drawings.

A first embodiment will be described in which the present invention is applied to a pre-edit support system of a machine translation system.

Figure 1:
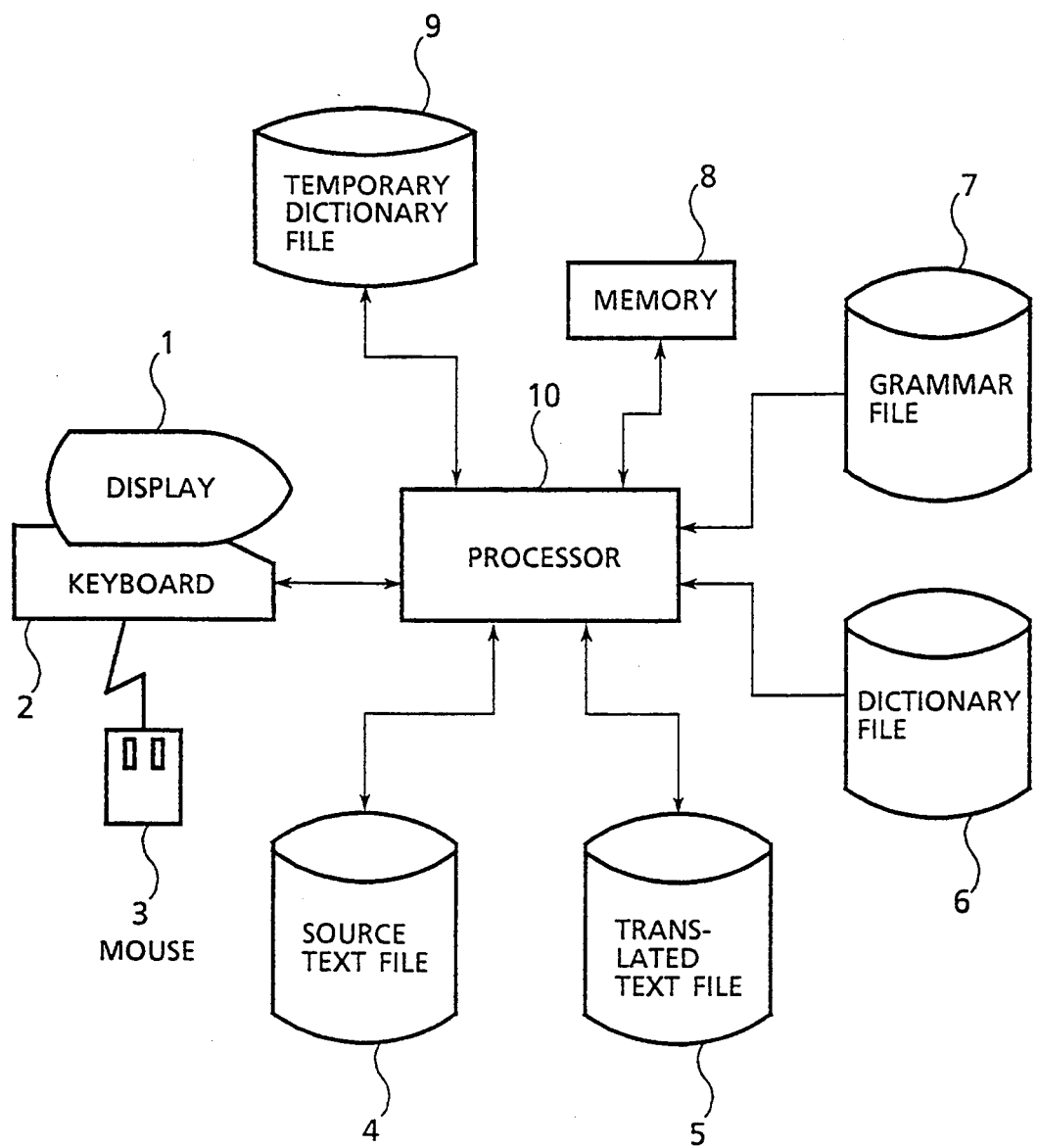
FIG. 1 shows the hardware structure of an embodiment of a machine translation system according to the present invention.

FIG. 1 shows the hardware structure of the embodiment system. In FIG. 1, reference numeral 1 represents a display, and reference numeral 2 represents a keyboard having a number of keys (not shown) including a "mode select" key, a "cursor" key, a "complex word select" key, a "search parent" key, a "search child" key, a "next candidate" key, a "fix" key, and other keys. Reference numeral 3 represents a mouse, reference numeral 4 represents a source text file for storing inputted English source texts, reference numeral 5 represents a translated text file for storing a Japanese text as result of translation, reference numeral 6 represents a dictionary file, and reference numeral 7 represents a grammar file for storing grammar to be used for translation. Reference numeral 8 represents a memory having a number of tables to be described later, including a word table 81, a complex word flag table 82, a complex word table 83, a parent table 84, a child table 85, a complex word display table 86, a complex word status table 87, a node table 88, and other tables. Reference numeral 9 represents a temporary dictionary file for temporarily storing dictionary data, and reference numeral 10 represents a processor for controlling the whole system.

Figures 4, 5:
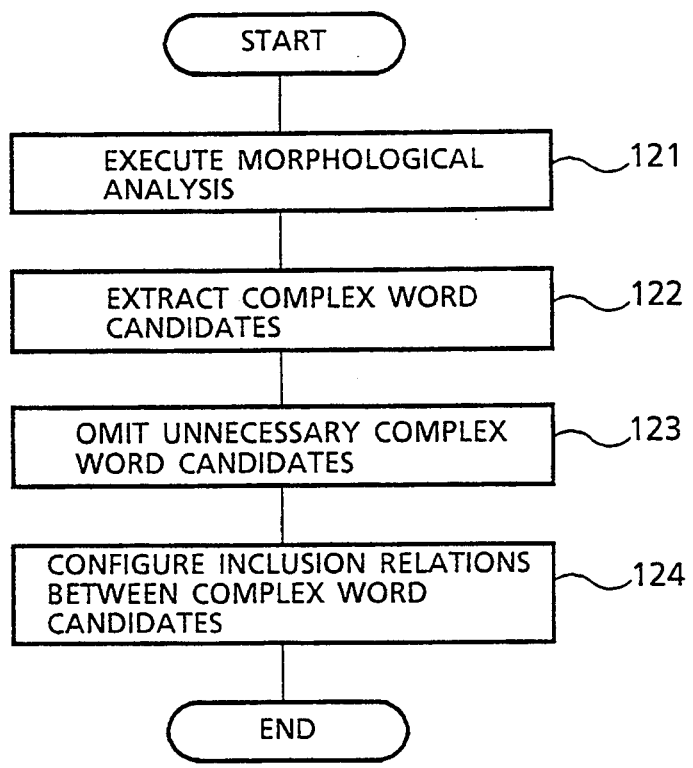
FIG. 4 is a flow chart showing the procedure of extracting complex word candidates.
FIG. 5 shows an example of a word table 81.

The embodiment system shown in FIG. 1 will further be described with reference to the flow chart of FIG. 2 showing the overall procedure. A source text is read from a source text file 4 (step 11). An example of such a source text is shown in FIG. 3. Candidates of complex words are extracted from the read-in source text (step 12). This step 12 will be detailed with reference to the flow chart shown in FIG. 4.

Each sentence of a source text is morphologically analyzed (step 121). Because morphological analysis can be made by using a method disclosed, for example, in JP-A-58-40684 corresponding to U.S. Pat. No. 4,641,264 assigned to Hitachi Ltd., and JP-A-59-121574, the description of the analysis method is omitted. The morphological analysis results are stored in the word table 81 which stores the word and positions of start and end characters of each word in the sentence. For example, referring to the first word of the first sentence of the word table 81 shown in FIG. 5, it can be seen that the first word of the first sentence is "fuzzy" and that the start character position of this word is "1" in the sentence 1 and the end character position is "5".

The contents of the dictionary file 6 for the words searched during the morphological analysis are copied to the temporary dictionary file 9 which can store sufficient dictionary data necessary for the translation of the source text. By using file 9, the translation can be performed at high speed.

Figure 6:
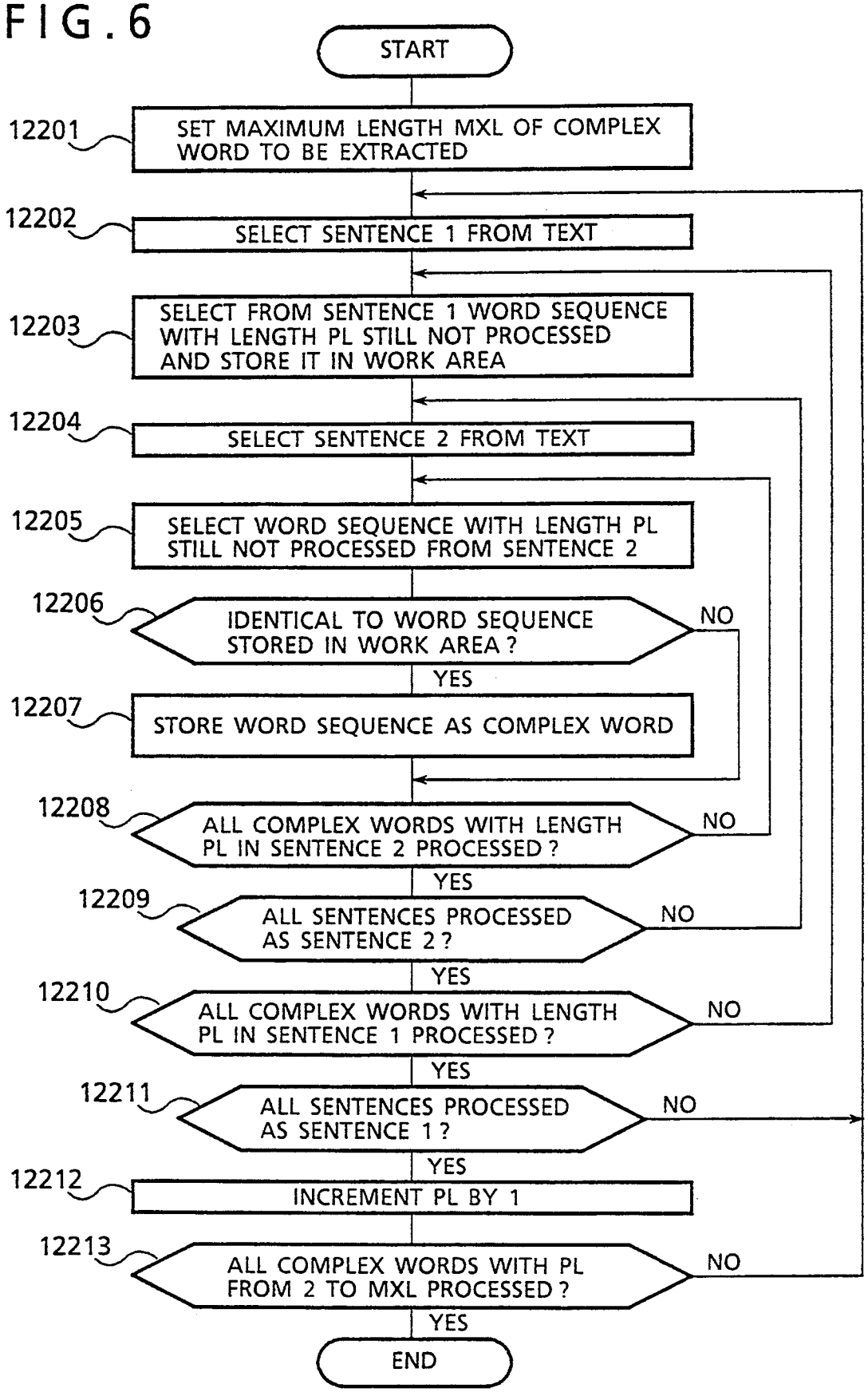
FIG. 6 is a flow chart showing the procedure of extracting complex word candidates.
Figures 7, 8:
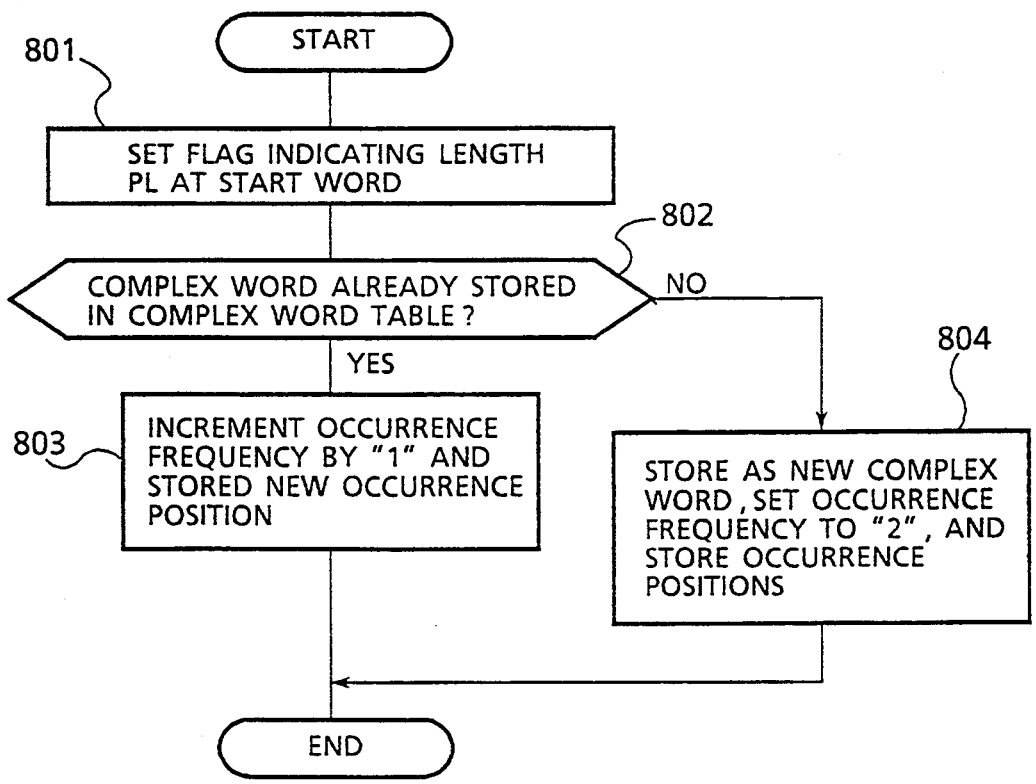
FIG. 7 shows an example of a complex word flag table 82.
FIG. 8 is a flow chart showing the procedure of storing complex words.

Candidates of complex words are then extracted (step 122). This step 122 will be detailed with reference to the flow chart shown in FIG. 6. A user designates the maximum value of the number of words constituting a complex word to be extracted (step 12201). This value is represented as MXL. There is a tradeoff between the maximum value MXL and a processing time. Namely, if a large MXL value is designated, although a possibility of a failure in extracting a complex word becomes low, the processing time becomes long. On the other hand, if a small MXL value is designated, although a possibility of a failure in extracting a complex word becomes high, the processing time becomes short. This value is generally set to be "4" or "5". A sentence is selected from the text as a sentence 1 (step 12202). A word sequence having a length PL is selected from the sentence 1 as a word sequence 1 which has not yet been processed as a complex word, the selected word sequence 1 being stored in a work area (step 12203). The length PL has its initial value "2", and can take a value up to the maximum value MXL. Whether a word sequence has been registered as a complex word is checked by reference to the complex flag table 82. An example of the table 82 is shown in FIG. 7. Each row of the table 82 corresponds to a sentence, and each column corresponds to a word of the corresponding sentence. Each column stores a string of "1s" and "0s". If the word is the start word of a complex word having the length i (i=2, 3, 4, ...), the (i-1)-th digit from the leftmost of the string is set to be "1". For example, the numerals or bit sequence "100 . . . " stored in the column of the word 1 of the sentence 1 indicates that the word 1 or "fuzzy" of the sentence 1 is the start word of the complex word "fuzzy reasoning" having the length "2".

Another sentence is selected as a sentence 2 from sentences of the text following the sentence 1 (step 12204). A word sequence 2 having the length "2" is selected from word sequences of the sentence 2 after the word sequence 1 (step 12205). The word sequence 1 selected from the sentence 1 is compared with the word sequence 2 selected from the sentence 2 (step 12206). If both the word sequences are the same, the procedure advances to step 12207, and if not, the procedure jumps to step 12208.

A process of storing a complex word is executed (step 12207). This step 12207 will be detailed with reference to the flow chart shown in FIG. 8. A flag indicating that the complex word has the length PL is set to the start word of a complex word (step 801). Specifically, the start word of a complex word is determined, and the (PL-1)-th digit from the leftmost digit in the column corresponding to the start word in the complex word flag table 82 are set to "1". It is checked whether an entry of the complex word has already been stored in the complex word table 83 (step 802). An example of the table 83 is shown in FIG. 9. The table 83 stores the serial numbers of complex words, the word sequence, the number of words, the occurrence frequency and the occurrence position, respectively of each complex word. The occurrence position is defined by the sentence number in which a complex word is contained and by the position of the start word of the complex word. If an entry of the complex word has been already stored in the table 83, the procedure advances to step 803, and if not, the procedure advances to step 804. The occurrence frequency is incremented by "1", and the new occurrence position, i.e., the position of the start word of the word sequence 2, is stored in the table 83 (step 803). A new entry is stored, together with the occurrence frequency "2" and the positions of the start words of the word sequences 1 and 2 (step 804).

It is checked whether all word sequences having the length PL in the sentence 2 have been processed (step 12208). If all complex words have been processed, the procedure advances to step 12209, and if not, the procedure returns back to step 12205 to select another word sequence having the length PL from the sentence 2. It is checked whether all sentences have been processed as the sentence 2 (step 12209). If processed, the procedure advances to step 12210, and if not, the procedure returns back to step 12204 to select a next sentence as the sentence 2. It is checked whether all complex words having the length PL in the sentence 1 have been processed (step 12210). If processed, the procedure advances to step 12211, and if not, the procedure returns back to step 12203 to select another word sequence having the length PL from the sentence 1. It is checked whether all sentences have been processed as the sentence 1 (step 12211). If processed, the procedure advances to step 12212, and if not, the procedure returns back to 12202 to select another sentence as the sentence 1 from the source text. The length PL of a complex word candidate is incremented by "1" (step 12212). It is checked whether all lengths PL from the initial value "2" to the maximum value MXL have been checked (step 12213). If not checked, the procedure returns to Step 12202 to repeat the processes for the new PL, and if checked, the procedure terminates.

Unnecessary candidates of complex words are deleted (step 123). The condition that a complex word candidate is unnecessary is (1) beginning with a preposition or conjunction, (2) ending with an article, preposition, or conjunction, (3) having a "be" verb or "have" verb. A candidate satisfying such conditions is deleted from the complex word table 83. Finally, complex word candidates are extracted by the above-described procedures. FIG. 10 shows an example of complex word candidates extracted from the text shown in FIG. 3.

An including relation between complex words is configured (step 124). That a complex word A "includes" a complex word B defines that all words of the complex word B are present in the complex word A in the same occurrence order of the words of the complex word B, and that a word not included in the complex word B is not present within a chain of the words of the complex word B in the complex word A. For example, a complex word "fuzzy reasoning mechanism" includes a complex word "fuzzy reasoning". If a complex word A includes a complex word B, the word A is called a parent of the word B, and the word B is called a child of the word A.

Figure 11:
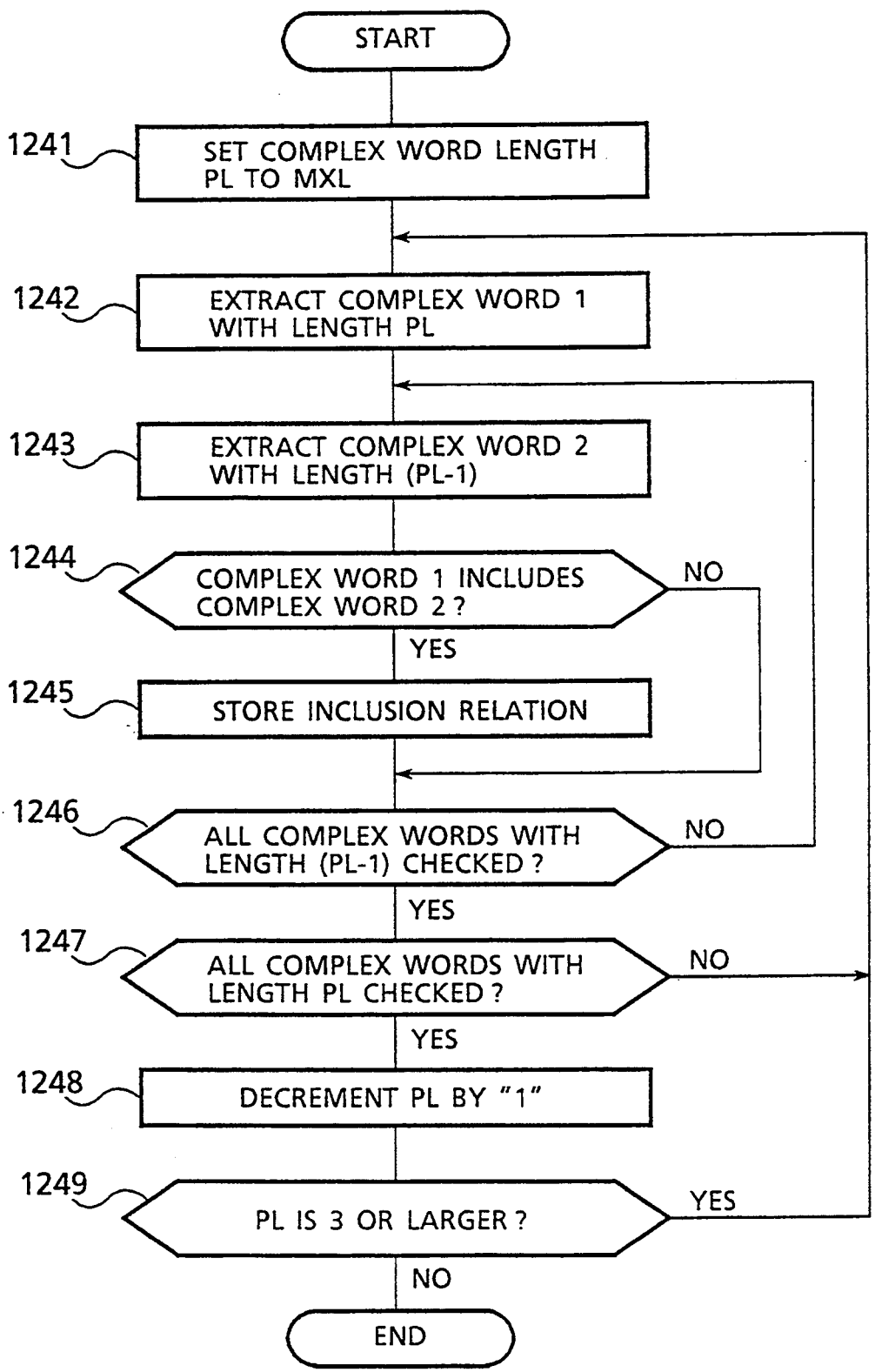
FIG. 11 is a flow chart showing the procedure of configuring inclusion relations between complex words.

The procedure of configuring an including relation will be detailed with reference to the flow chart shown in FIG. 11.

Figure 12:
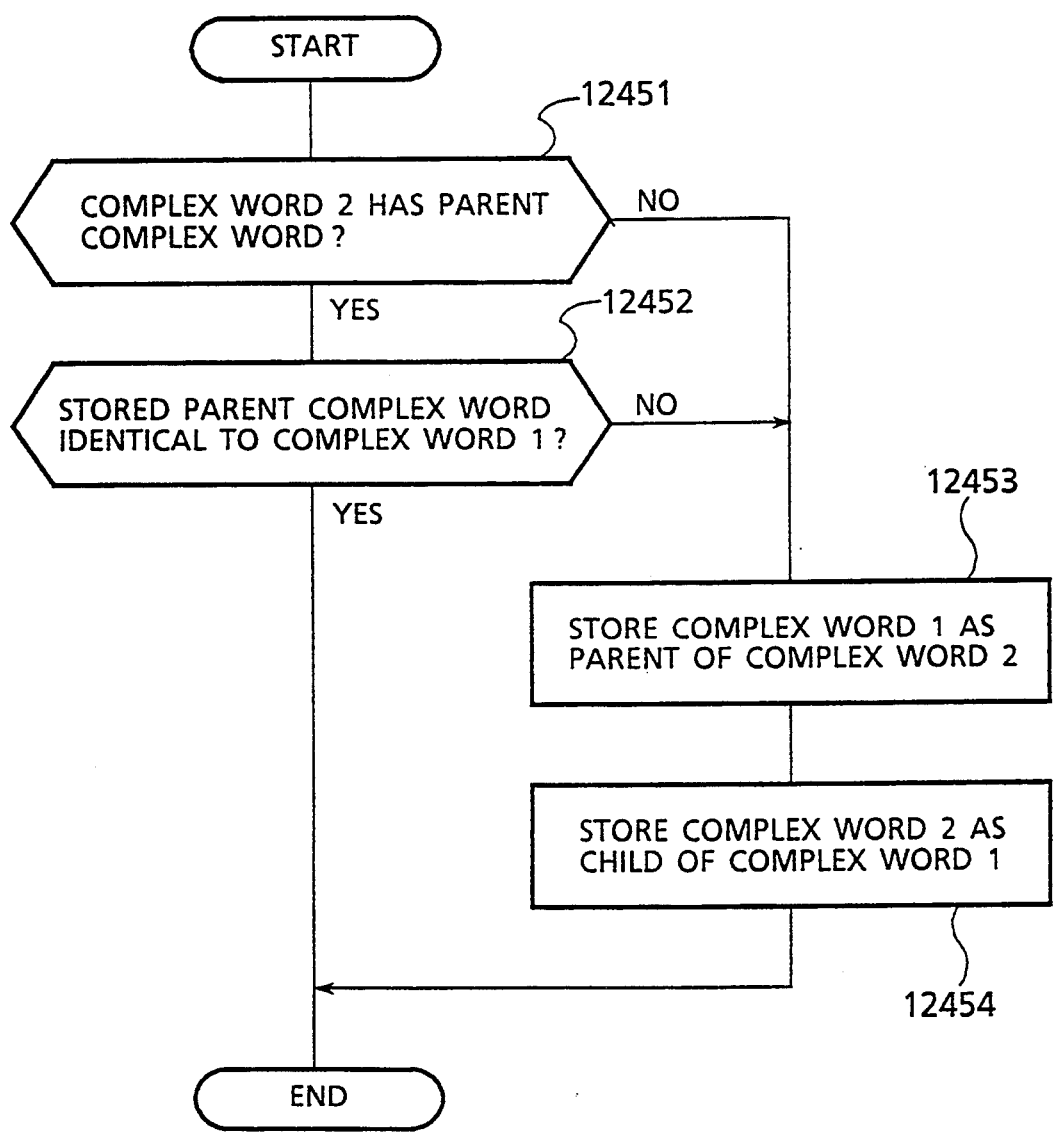
FIG. 12 is a flow chart showing the procedure of storing inclusion relations to a parent table 84 and child table 85.

The length PL of a complex word is set to the maximum length MXL designated by a user at step 12201 (step 1241). A complex word having the length PL is extracted as a complex word 1 from the complex word table 83 (step 1242). A complex word having the length (PL-1) is extracted as a complex word 2 (step 1243). It is checked whether the complex word 1 includes the complex word 2 (step 1244). If included, the procedure advances to step 1245, and if not, the procedure jumps to step 1246. The including relation is stored (step 1245). This step 1245 will be described with reference to the flow chart shown in FIG. 12. It is checked whether the complex word 2 has any parent complex word stored in the parent table 84 (step 12451). If there is any stored parent complex word, the procedure advances to step 12452. If not, the procedure advances to step 12453. The stored parent complex word is compared with the complex word 1 (step 12452). If the complex word 1 has not yet been stored, the procedure advances to step 12453 whereas the complex word 1 is registered as a new parent complex word of the complex word 2 (step 12453). Specifically, the complex word 2 is searched from the parent table 84, and the number of parent complex words for the complex word 2 is incremented by "1", and the serial number of the complex word 1 is stored in the parent complex word column. In addition, the word of the complex word 1 corresponding to the start word of the complex word 2, i.e., the position of the child complex word within the parent complex word, is checked and stored in the corresponding child complex word position column. For example, the position of a child complex word "fuzzy reasoning" relative to a parent complex word "fuzzy reasoning function" is indicated by "1", and the position of a child word "reasoning function" is indicated by "2". An example of the parent table 84 is shown in FIG. 13. The serial number of each complex word corresponds to the serial number in the complex word table 83. The complex word 2 is stored as a new child complex word of the complex word 1 (step 12454). Specifically, the number of child complex words for the complex word 1 is incremented by "1" in the child table 85, and the serial number of the complex word 2 is stored in the child complex word column. In addition, the position of the child complex word within the parent complex word, is stored in the corresponding child complex word position column. An example of the child table 85 is shown in FIG. 14.

It is checked whether all complex words having the length (PL-1) have been processed (step 1246). If processed, the procedure advances to step 1247, and if not, the procedure returns back to step 1243 to extract the next complex word having the length (PL-1). It is checked whether all complex words having the length PL have been processed (step 1247). If processed, the procedure advances to step 1248, and if not, the procedure returns back to step 1242 to extract the next complex word having the length PL. The length PL is decremented by "1" (step 1248). It is checked if the length PL is 3 or larger (step 1249). If 3 or larger, the procedure returns to step 1242 to repeat the above processes for the new complex word having the new length PL. If smaller than 3, the procedure terminates.

Ones of the extracted complex word candidates satisfying certain conditions are determined as candidates to be displayed (step 13). The conditions to be satisfied by a complex word candidate to be displayed include that (1) a candidate has a high occurrence frequency within a text, and that (2) a candidate has many words with multiple parts of speech. A word having multiple parts of speech is one which can take a plurality of parts of speech. For example, an English word "fly" is a word with multiple parts of speech, which takes either a noun meaning a "housefly" or a verb meaning "to move through the air".

Figure 15:
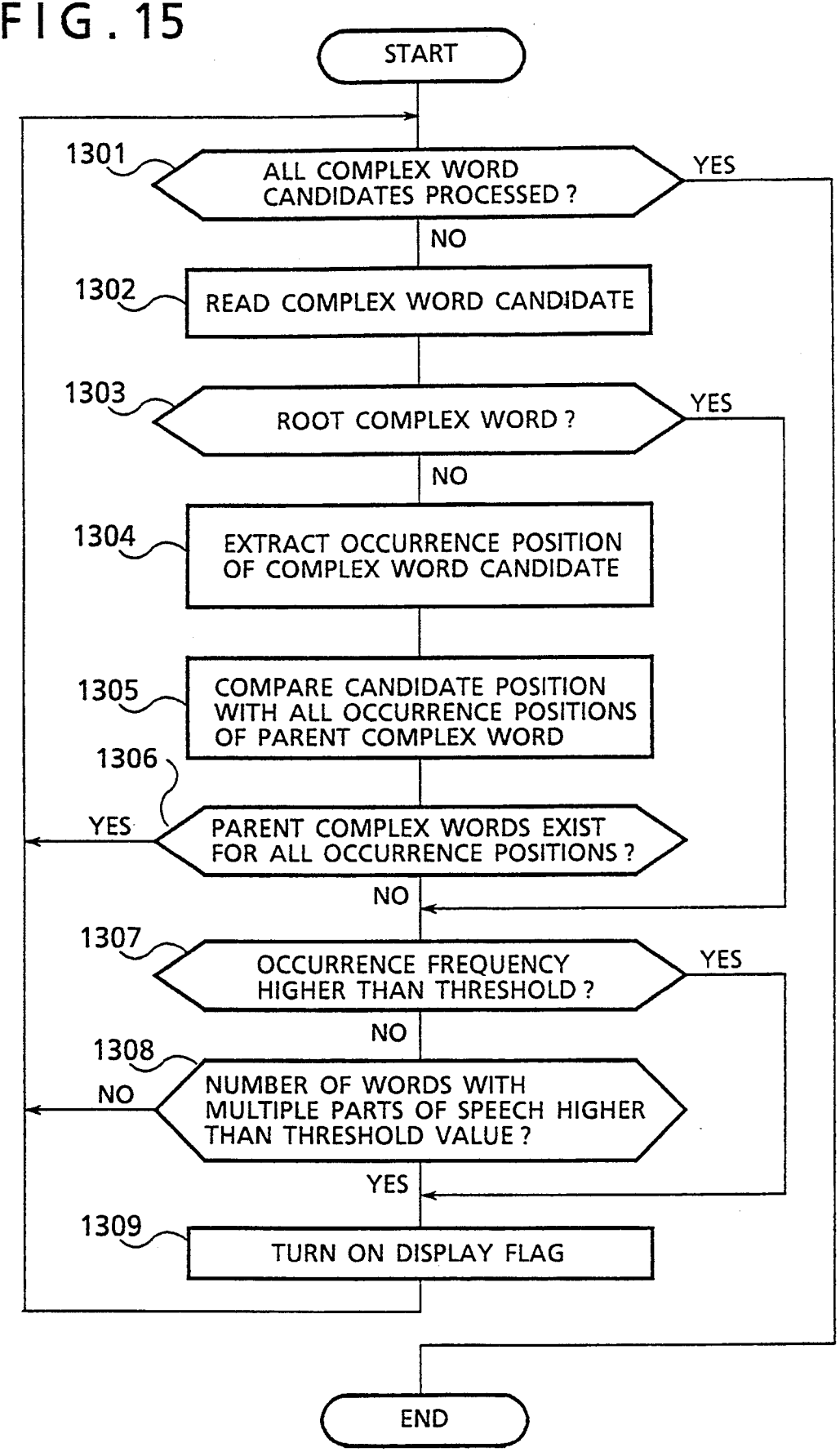
FIG. 15 is a flow chart showing the procedure of determining complex word candidates to be displayed.

Since a complex word has a parent-child relation, the following case should be taken into consideration. For example, if there is a complex word "fuzzy reasoning function", a partial word sequence "fuzzy reasoning" may be extracted as its child complex word. In this case, if the complex word "fuzzy reasoning" occurs only as part of the complex word "fuzzy reasoning function", it is not necessary to extract the complex word "fuzzy reasoning" as a complex word candidate. On the other hand, if the complex word "fuzzy reasoning" occurs singularly, it is necessary to extract the complex word "fuzzy reasoning" as well as the complex word "fuzzy reasoning function" as a complex word candidate. The following conditions are also provided, including that (3) a candidate is a root complex word which has no parent complex word, and that (4) it is not root and it occurs such that it does not have the parent complex word at the position. Complex words satisfying the above conditions (1) to (4) are extracted and displayed. This step 13 will be detailed with reference to the flow chart shown in FIG. 15.

It is first checked whether all complex word candidates have been processed (step 1301). If processed, the procedure terminates, and if not, the procedure advances to step 1302.

One of the complex word candidates is read from the complex word table 83 (step 1302). It is checked whether the read out candidate is a root candidate which has no parent complex word (step 1303). This check can be judged by referring to the number of parent complex words in the parent table 84. If a root candidate, the procedure jumps to step 1307, and if not, the procedure advances to step 1304.

One of the occurrence positions is read from the table 83 (step 1304). A parent complex word is extracted from the parent table 84, and all occurrence positions of the extracted parent complex word are compared with the occurrence position of the complex word candidate extracted at step 1304 (step 1305). The occurrence position is represented, as described previously, by the serial number of the sentence including the complex word candidate and the start position of the candidate within the parent complex word. Therefore, this comparison cannot be carried out directly from the read-out occurrence position. In view of this, the comparison is carried out by modifying the position of the start word of the candidate by the position of the candidate within the parent complex word. Specifically, if the sentence having the complex word candidate is the same sentence having the parent complex word, and if the position [(position of the start word of the complex word candidate)+1−(position of the candidate within the parent complex word)] is the same as the position of the start word of the parent complex word, then the complex word candidate is considered as included in the parent complex word at the occurrence position in concern.

For example, the second occurrence position (2, 2) of the complex word "fuzzy reasoning" in the complex word table 83 shown in FIG. 9 indicates that the second and third words constitute the complex word. The first complex word "fuzzy reasoning function" is extracted from the parent table 84 to be compared with the complex word candidate "fuzzy reasoning" with respect to the position. The first occurrence position of the parent complex word can be found as (2, 2) from the complex word table 83. More particularly, both the complex word candidate and the parent complex word occur in the second sentence, and the position "2" of the start word of the parent complex word is the same as the position [(position of the start word of the complex word candidate)+1−(position of the candidate within the parent complex word)]=2+1−1="2". Therefore, it can be said that the parent complex word exists at the second occurrence position of the complex word candidate "fuzzy reasoning".

If all complex words at their occurrence positions have corresponding parent complex words (step 1306), the procedure returns back to step 1301 to check whether there is another complex word candidate. If a complex word candidate has the occurrence position where there is no corresponding parent complex word, the procedure advances to step 1307.

The occurrence frequency of a complex word candidate is checked (step 1308). If the occurrence frequency is higher than a predetermined threshold value, the procedure jumps to step 1309, and if not, the procedure advances to step 1309.

The number of the words with multiple parts of speech is checked. If the number is higher than a predetermined threshold value, the procedure advances to step 1309, and if not, the procedure returns back to step 1301 to check whether there is another complex word candidate. With this step 1308, it is possible to extract a complex word having many words with multiple parts of speech, which is essential for the improvement of accuracy of parsing. It is preferable for this step 1308 to provide a threshold value of an occurrence frequency to check only complex words having a value equal to, or higher than the threshold value. This threshold value is necessary to set lower than that used at step 1307. A display flag in the complex word display table 86 is set or turned on for a complex word candidate to be displayed (step 1309), and thereafter, the procedure returns to step 1301.

An example of the complex word display table 86 is shown in FIG. 16. In the example of FIG. 16, the first complex word "fuzzy reasoning function" and third complex word "fuzzy reasoning mechanism" are a root complex word, so that the display flag is set to "1". Although the second complex word "fuzzy reasoning" is not a root complex word, it occurs at the position independent from the parent complex word, as in the sentence 1 shown in FIG. 3, so that the display flag is also set to "1".

Complex word candidates determined by the above-described processing are displayed. As the display mode for complex word candidates, two types of display modes, a candidate list display mode and a in-text emphasis mode, are provided. As shown in FIG. 17, there is displayed during the candidate list display mode, a list of all complex word candidates with a turned-on display flag indicated in the complex word display table 86. As shown in FIG. 18, in the in-text emphasis display mode, complex word candidates are emphatically displayed on the source text.

Figure 19:
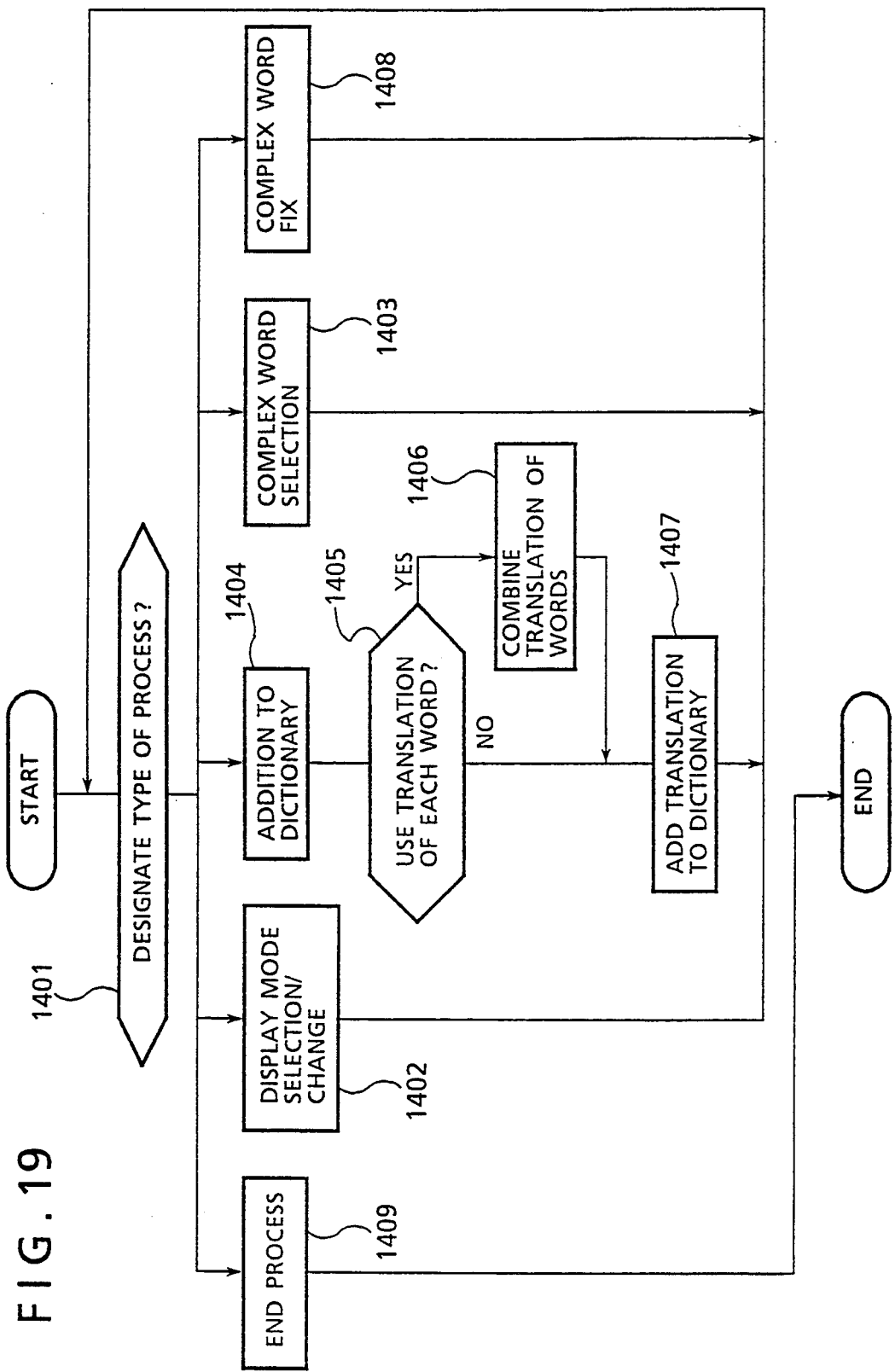
FIG. 19 is a flow chart showing the procedure of selecting complex words by a user.

A user selects complex word candidates to be translated as a complex word, while looking at the displayed results (step 14). The operation flow of complex word candidate selection by a user will be detailed with reference to the flow chart of FIG. 19.

A user designates the type of process (step 1401). As the type of process, there are prepared four types including display mode selection/change, complex word selection, addition to dictionary, and complex word fixing. In accordance with the selected type of process, the procedure advances to one of steps 1402, 1403, 1404 and 1408. If a procedure end is designated, the procedure advances to step 1409.

A user selects the display mode (step 1402). The display mode is selected upon actuation of the "mode select" key of the keyboard 2. The system then displays complex word candidates in the display mode the user designated. Complex word candidates to be displayed are those having the turned-on display flag in the complex word display table 86. In the candidate list display mode, candidates are displayed in order from the longest word candidate. Candidates having the same length are displayed in order from the highest occurrence frequency, or may be displayed in the alphabetical order. Designating such a display order is arranged to be changeable by a user.

A user designates complex word candidates each to be processed as an integrated word, from the displayed complex word candidates (step 1403). In this embodiment, in designating a desired complex word, a cursor is moved to the position at the desired complex word by using the "cursor" key and thereafter the "complex word select" key is depressed. How the complex word candidate is finally selected differs between the candidate list display mode and the in-text emphasis display mode. In the candidate list display mode, the complex word candidate indicated by the cursor is selected. In the in-text emphasis display mode, when a complex word candidate is pointed by the cursor, the ultimate parent complex word candidate is selected from complex word candidates inclusive of the pointed complex word candidate. The selected complex word is displayed emphatically by changing its brightness or changing its display color. Instead of the keyboard 2, the mouse 3 may be used to select a complex word. The above-described mode selection/change can be realized easily by using interface programs generally used by personal computers and workstations, and so a further description thereof is omitted. When a user designates complex word candidates, the candidates are held in a select state. For each of the candidates once selected, "1" is stored in the corresponding select state column of the complex word state table 87 shown in FIG. 20.

When the "parent search" key or "child search" key is depressed under the select state of any complex word, the parent or child complex word candidate of the selected complex word is searched to select one of the parent and child complex word candidates, by referring to the parent table 84 or child table 85. All parent or child complex word candidates are being held in an array, and when the "next candidate" key is depressed, another parent or child complex word candidate enters the select state. In the candidate list display mode, a parent or child complex word candidate can be identified by using only the above-described information. However, in the in-text emphasis display mode, it is necessary to locate the position of a searched parent or child complex word candidate. Therefore, the position of the searched parent or child complex word candidate is determined by further referring to the parent table 84 or child table 85.

Addition of a complex word to the dictionary is then made (step 1404). Translations of words constituting each complex word candidate are displayed. An example of displayed translations is shown in FIG. 21. In this example, the translation "suiron (Japanese)" for "reasoning" can be used as it is, so that "1" is selected. However, the translations "kebadatta" and "boyaketa" for "fuzzy" cannot be used, so that "fazi (Japanese)" is entered in the other column "3". If all displayed translations cannot be used, a translation for the displayed complex word candidate is entered in the translation column.

If the translations for the selected complex word is entered (step 1405), the procedure advances to step 1406, and if not, the procedure advances to step 1407. The displayed translations for each word are combined to obtain a final translation of the displayed complex word (step 1406). The final translation is added to the dictionary (step 1407).

If the selected complex word candidate is decided to be used as a complex word, a user fixes this complex word candidate (step 1408). In fixing the complex word candidate, the "complex word candidate" key is depressed under the select state of the complex word candidate. The fix state is established by storing "1" in the fix state column of the complex word state table 87.

Prior to terminating the procedure, the procedure end process is executed (step 1409). A user is requested to decide how the complex word selected, but not yet fixed, is processed. This request is made by extracting from the complex word table 83 complex words having "1" in the select state column and "0" in the fix state column of the complex word table 87 and by displaying the extracted complex words.

The following check is carried out in order to reliably fix a complex word candidate. In the display example of FIG. 17 during the candidate list display mode, three complex word candidates are displayed, including "fuzzy reasoning", "fuzzy reasoning function", and "fuzzy reasoning mechanism". Consider the case where the complex word candidate "fuzzy reasoning mechanism" is selected in the manner described above. In this case, a presence of the complex word candidate "fuzzy reasoning" is not easy to be recognized at a glance from the candidate list. However, the presence of the candidate "fuzzy reasoning" can be found by depressing the "child search" key with or without a further depression of the "next search" key, showing the select state and presence of the candidate "fuzzy reasoning". If "fuzzy reasoning" is treated as one noun phrase, "fuzzy reasoning mechanism" is also treated as one noun phrase, because the "mechanism" is a noun. Therefore, the user fixes "fuzzy reasoning" as a complex word. Next, as the "parent search" key is depressed, the candidate "fuzzy reasoning function" is searched as the parent complex word. Since the word "function" is a word with multiple parts of speech usable both as a noun and verb, it is effective for improvement of parsing accuracy to treat the candidate "fuzzy reasoning function" as a complex word and it is fixed. In order to ensure a more reliable fixation, fixing the candidate "fuzzy reasoning function" may be confirmed after checking whether the word "function" is being used as a verb in the text by using the in-text emphasize display mode.

For another check example, consider the complex word candidate "XXXX/1 and XXXX/2" of the display example of FIG. 17 during the candidate list display mode. It prevents parsing error to treat the candidate as a complex word, though such a phenomenon, i.e., coordination or ellipsis, raises parsing error. For example, in the second sentence of the source text example, the phrase "a new function of XXXX/1 and XXXX/2" can be prevented from being parsed as "[[a new function of XXXX/a] and XXXX/2]".

Figure 22:
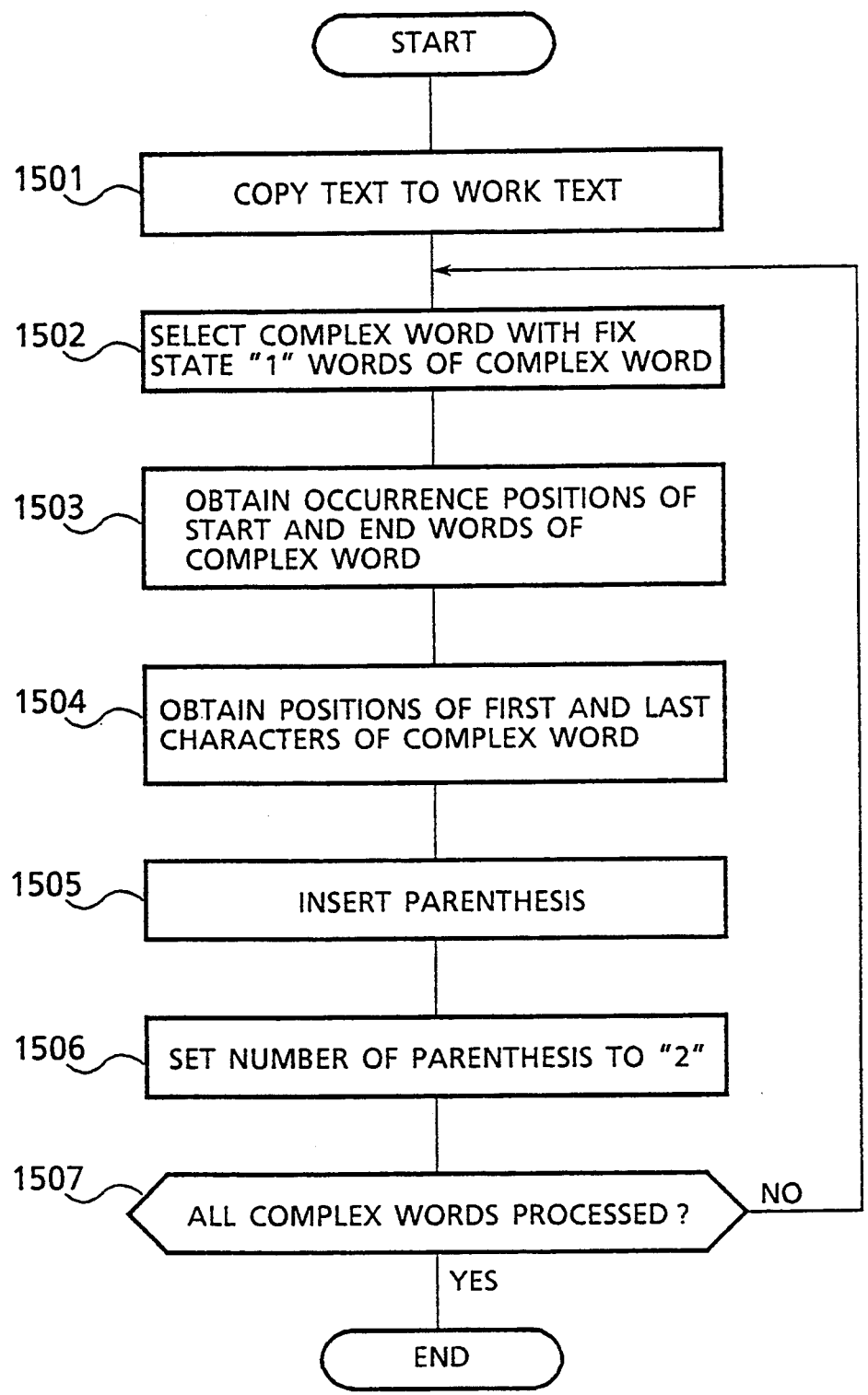
FIG. 22 is a flow chart showing the procedure of inserting pre-edit symbols.

Pre-edit symbols are inserted in the source text having complex words selected and fixed by a user (step 15). As a pre-edit symbol, parentheses generally used in machine translation systems are used to designate parts of the text to be processed integrally. The procedure of parenthesizing a complex word fixed by a user will be described with reference to the flow chart of FIG. 22.

The source text is copied to obtain a work text (step 1501). Complex words having "1" in the fix state column in the complex word state table 87 are obtained (step 1502). The occurrence positions of the start and end words of each complex word obtained in the step 1502 are obtained by referring to the complex word table 83 (step 1503). Referring to the word table 81, the positions of the first character of the start word and the last character of the end word of the complex word obtained at step 1503, are obtained (step 1504).

A left parenthesis is inserted in the work text at the position immediately before the position (start character position obtained at step 1504+number of inserted parentheses), and a right parenthesis is inserted at the position immediately after the position (last character position+number of inserted parentheses+1) (step 1505). The initial value of the number of inserted parentheses is "0". The number of inserted parentheses is incremented by "2" (step 1506). It is checked whether all complex words having "1" in the fix state column have been processed (step 1507). If processed, the procedure terminates, and if not, the procedure returns back to step 1502.

In the above manner, a pre-edited text can be generated, with a number of word sequences each to be dealt with an integrated complex word being parenthesized. An example of the pre-edited text is shown in FIG. 23. In translating the pre-edited text, a translation method generally used in machine translation systems may be used, the description thereof being omitted.

As described above, according to the pre-edit support system of the present invention, complex word candidates are extracted from a source text to be translated, in accordance with the occurrence frequency of each word sequence, and a user designates and fixes some of the extracted complex word candidates as the complex word to be integrally processed, thereby improving the accuracy of translation.

A second embodiment of the present invention applied to an English-Japanese machine translation system will be described in detail with reference to the flow chart shown in FIG. 24.

Figure 25:
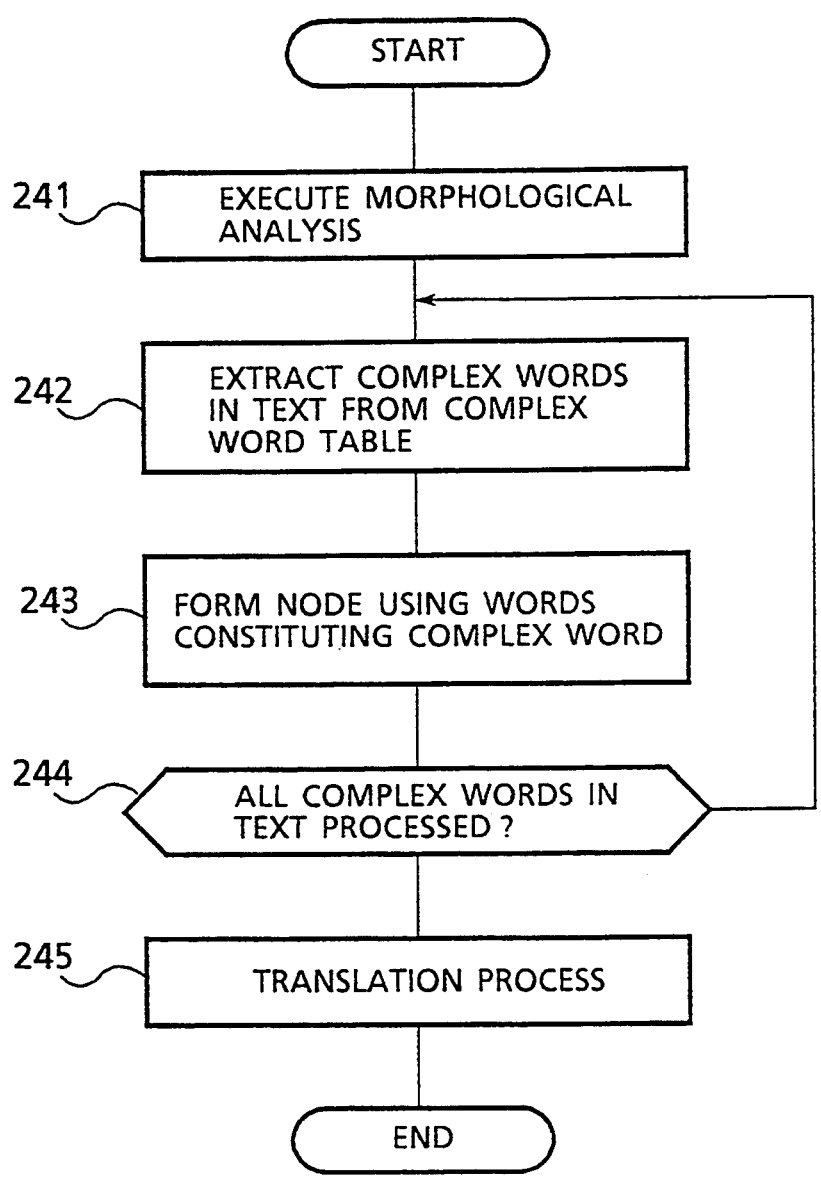
FIG. 25 is a flow chart showing the procedure of translation processes according to the second embodiment.

A source text is read from a source file 4 (step 21). Complex word candidates are extracted (step 22). This step 22 is similar to step 12 of the first embodiment, and so the detailed description is omitted. Complex words are selected from the complex word candidates (step 23). This step 23 is similar to the procedure of determining complex word candidates to be displayed at step 13 of the first embodiment, and so the detailed description is omitted. However, in the second embodiment, the threshold value of the occurrence frequency to be used for the extraction of complex word candidates is preferably set to a higher value than the threshold value set in the first embodiment, in order to avoid the selection of insignificant word sequences while automatically extracting complex word candidates. Each sentence is then translated (step 24). This step 24 will be described in detail with reference to the flow chart shown in FIG. 25.

Figures 26, 27:
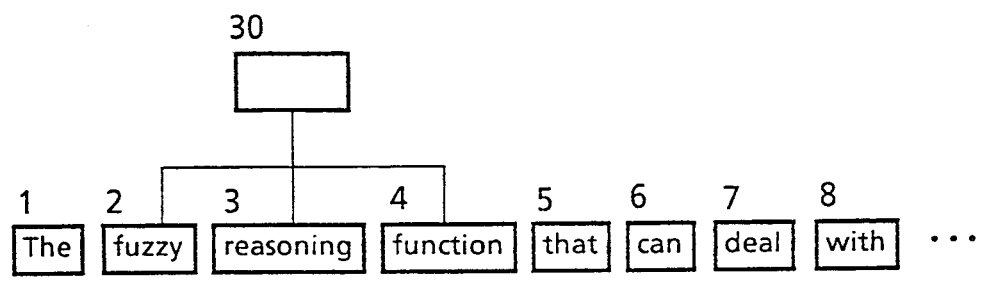
FIG. 26 shows an example of a node table 88 to be used by translation processes.
FIG. 27 is a schematic diagram showing part of the contents of the node table 88.

A morphological analysis is performed (step 241). The morphological analysis can be realized by using the method disclosed for example in JP-A-58-40684 corresponding to U.S. Pat. No. 4,641,264 assigned to Hitachi Ltd. and JP-A-59-121574, and so the detailed description is omitted. Since the morphological analysis is used in extracting complex words, the results of the morphological analysis may be stored and used at this step 241 for the purpose of speeding up the processing time. If there is any restriction on the memory capacity or the like, the morphological analysis may be executed again at this step 241. In such a case, the temporary dictionary file 9 may be used to speed up the translation procedure. Complex words are extracted from each sentence while referring to the complex word table 83 (step 242). A node is generated in a node table 88 based upon a sequence of words constituting a complex word, the node table being used for the translation of a sentence (step 243). An example of the node table 88 is shown in FIG. 26. The node table 88 stores the sentence parsing results. The contents of the node table 88 of FIG. 26 are schematically diagramed in FIG. 27. It is checked whether all complex words contained in the sentence have been processed (step 244). If processed, the procedure advances to step 245, and if not, the procedure returns to step 242. Translation processes such as parsing, morphological transformation and generation are executed (step 245). These processes can be realized by using the methods disclosed for example in JP-A-58-40684 corresponding to U.S. Pat. No. 4,641,264 assigned to Hitachi Ltd. and JP-A-59-121574, and so the detailed description is omitted.

In the second embodiment, complex words are automatically selected. However, similar to the first embodiment, the step of designating complex words by a user may be added.

According to the second embodiment, word sequences are extracted prior to the translation procedure, and the word sequences are processed integrally as the complex words prior to parsing, thereby improving the accuracy of parsing.

According to the present invention, frequently occurring word sequences are extracted as complex word candidates and provided to a user on a display. When the user considers some candidates usable as the complex word, it is allowed to be treated as the complex word. Therefore, errors in discriminating between a verb and noun are reduced, without adding a translation of a complex word to the dictionary, thereby improving the accuracy of parsing. Since it is not necessary to add a translation to the dictionary, the present invention is effective particularly for those complex words whose translation is not necessary or improper to be added to the dictionary.

As compared to a conventional pre-edit support method, frequently occurring word sequences are dealt with as complex word candidates, and a designation given by a user is effective for a plurality of related complex words, providing a more efficient pre-edit word.

I claim:

1. In a machine translation system translating a source language into a target language, a translation support method comprising the steps of:
   reading a source language text;
   dividing said text into words;
   extracting, from sequential said words from said dividing step, sequential word groups which occur a plurality of times throughout said text;
   displaying ones of extracted said sequential word groups satisfying a predetermined occurrence frequency, as complex word candidates; and
   allowing user selection of at least one complex word candidate of said complex word candidates, to be treated as a complex word which is to be translated as an integral complex word.

2. A translation support method as claimed in claim 1, further comprising the step of:
   inserting translation support information in a display of said text by providing a predetermined indication at positions where said at least one complex word candidate occurs.

3. A translation support method as claimed in claim 1, further comprising the steps of:
   displaying at least one translation of each word of said at least one complex word candidate;
   selecting a correct translation of each word from displayed said at least one translation; and
   adding a translation of said at least one complex word candidate to a dictionary; and
   providing a correction of a displayed translation.

4. A translation support method as claimed in claim 1, comprising the further step of;
   setting predetermined inclusion relations defining conditions for displayed said complex word candidates, wherein displayed said complex word candidates satisfy a predetermined condition based on said predetermined inclusion relations in addition to said predetermined occurrence frequency, and wherein said predetermined condition requires a sequential word group of said sequential word groups to be one of a root complex word candidate which has no parent complex word candidate or a child complex word candidate which occurs independently of the parent complex word.

5. A translation support method as claimed in claim 1, comprising the further step of:
   selecting a display mode for displaying ones of said complex word candidates, wherein said display mode includes the modes of: at least one of a candidate list display mode and an in-text emphasis display mode.

6. In a machine translation system translating a source language into a target language, an automatic translation method comprising the steps of:
   reading a source language text;
   dividing said text into words;
   extracting, from sequential said words, at least one sequential word group occurring a predetermined number of times throughout said text as a complex word candidate to be presented to a user for possible selection as a complex word; and
   translating a selected said complex word as an integrated complex word, into said target language.

7. In a machine translation system translating a source language into a target language, a translation support apparatus comprising:
   a reading means for reading a source language text;
   a dividing means for dividing said text into words;
   an extracting means for extracting, from sequential said words from said dividing means, sequential word groups occurring a plurality of times throughout said text;
   a candidate means for displaying extracted said sequential word groups satisfying a predetermined occurrence frequency as complex word candidates; and
   a selecting means for user selecting, from displayed said sequential word groups from said candidate means, a complex word which is to be translated as an integral complex word.

8. A translation support apparatus as claimed in claim 7, further comprising:
   a complex word indication means for inserting translation support information in a display of said text by providing a predetermined indication at positions where a selected said complex word occurs.

9. In a machine translation system translating a source language into a target language, an automatic translation apparatus comprising:
   reading means for reading a source language text;
   a dividing means for dividing said text into words;

an extracting means for extracting, from sequential said words from said dividing means, sequential word groups occurring a predetermined number of times throughout said text as complex word candidates to be presented to a user for possible selection as a complex word; and a translating means for translating a selected said complex word as an integrated complex word, into said target language.

10. In a machine translation system translating a source language into a target language, a translation support method comprising the steps of:

reading a source language text;

dividing said text into words;

setting predetermined inclusion relations defining conditions required for designation of sequential word groups as complex word candidates;

extracting sequential word groups, from sequential said words from said dividing step, which satisfy said predetermined inclusion relations and which occur a plurality of times throughout said text as said complex word candidates;

storing an occurrence position of each extracted complex word candidate of said complex word candidates in said text;

comparing each occurrence position of each of said extracted complex word candidates with occurrence positions of parent complex word candidates of said complex word candidates, to thereby extract a complex word candidate having an occurrence position at which no parent complex word candidate occurs;

displaying any said complex word candidate of said complex word candidates satisfying a predetermined occurrence frequency; and selecting at least one complex word candidate from displayed said complex word candidates which is to be treated as a complex word.

11. In a machine translation system translating a source language into a target language, a translation support method comprising the steps of:

reading a source language text;

dividing said text into words;

extracting, from sequential said words from said dividing step, sequential word groups which occur a plurality of times throughout said text, wherein said step of extracting word sequences takes into consideration, in a determination of whether a word sequence is to be extracted, at least one of: (a) whether said word sequence includes words which can be categorized into alternative parts of speech, and (b) a ratio of words which can be categorized into alternative parts of speech to a total number of words on said word sequence;

displaying ones of extracted said sequential word groups satisfying a predetermined occurrence frequency, as complex word candidates; and allowing user selection of at least one complex word candidate of said complex word candidates, to be treated as a complex word which is to be translated as an integral complex word.

* * * * *